3,128,193
METHOD OF FREEZING A LOW FAT FROZEN DESSERT
Luther D. Hilker, Evanston, Ill., assignor to National Dairy Products Corporation, New York, N.Y., a corporation of Delaware
No Drawing. Filed Aug. 25, 1961, Ser. No. 133,794
4 Claims. (Cl. 99—136)

The present invention relates to an improved frozen dessert, and, more particularly, it relates to an improved low-fat frozen dessert.

Frozen desserts may be classified into those which include fat and those which are essentially free from fat. Examples of the former are ice cream, ice milk, and sherbet, and an example of the latter is a water ice. The present invention is directed toward frozen desserts which include fat, and is directed particularly toward those desserts which include relatively low quantities of fat, such as ice milk. At the present time Federal standards specify that ice milk shall comprise more than 2 percent of fat.

Heretofore, in general, the higher the fat level in a frozen dessert, the more pleasing and appetizing has been its texture and flavor. For example, ice cream, which usually comprises at least about 10 percent of milk fat, has heretofore had texture and flavor superior to the texture and flavor of frozen desserts comprising low proportions of fat.

At the same time, however, the higher the fat content of the frozen dessert, the more costly are the ingredients thereof, and the higher is the calorie content of the frozen dessert. Low fat frozen desserts having desirable texture and flavor characteristics like higher fat content desserts have not been heretofore attainable using conventional techniques.

Accordingly, it is an object of the present invention to provide an improved low-fat frozen dessert and a process of making the same. A more particular object of the present invention is to provide a low-fat frozen dessert which has an improved texture and flavor and a process of making the same. An additional object of the present invention is to provide a low-fat frozen dessert which has improved texture, flavor, and novel thawing characteristics, and a process for making the same. Another object of the present invention is to provide an ice milk which has ice-creamlike texture and flavor, and a process of making the same. Other objects and advantages of the present invention will become apparent from the following description.

Generally, the process of the present invention comprises the steps of preparing a dessert mix which includes between about 2 percent and about 10 percent of an edible fat, and subjecting the mix to intensive internal shear while the mix is cooled to an unusually low temperature. More particularly, the mix is maintained under intensive internal shear until the mix is cooled to a temperature whereat at least about 50 percent of the aqueous component of the mix is present in a crystalline state. The mix is thereafter packaged and hardened to provide the frozen dessert of the present invention.

The frozen dessert of the present invention comprises an aqueous component which is present in a continuous phase, and a fat component present in what appears to be a semi-continuous phase. In this connection, the fat component is present in the frozen dessert in the form of diffuse filaments, which are to be distinguished from the discrete globules or spheres of fat which are present normally in frozen desserts. This unique form and distribution of the fat component is thought to be responsible, in part, for the novel properties of the frozen dessert of the present invention, as will be more fully set forth hereinafter.

More particularly, in accordance with the present invention, a mix is prepared which comprises an aqueous component and a fat component. The fat component comprises less than about 10 percent of the mix, and may be any edible fat which is firm but spreadable at room temperature, such as milk fat and/or margarine fat. While a mix comprising more than about 10 percent of fat may be processed in accordance with the present invention, the texture and flavor of the frozen dessert so obtained are not as desirable as the texture and flavor of a frozen dessert made with lower levels of fat. On the other hand, the fat component should comprise at least about 2 percent of the mix in order to enjoy the benefits of the present invention.

The aqueous component will ordinarily comprise water, protein, and sweetening agents, and may also comprise stabilizers and flavoring ingredients. It should be pointed out that the mix may be any mix suitable for the preparation of low-fat frozen desserts heretofore known, such as ice milk mix, and that various mix compositions may be utilized, provided, of course, that the fat component comprises less than about 10 percent and more than about 2 percent of the mix.

The above-described mix is introduced into a heat exchanger for cooling thereof. It is important, in the practice of the present invention, that means be provided for subjecting the mix to intensive shear during the freezing step. One apparatus suitable for the practice of the present invention is a modified Votator heat exchanger.

The heat exchanger comprises one or more cylinders through which the mix is passed. A refrigerant is circulated outside the cylinder for cooling of the mix through the cylinder walls. A rapidly revolving axial shaft or mutator is provided in the cylinder, which mutator includes a plurality of radially-extending blades. The blades sweep the walls of the cylinder, to continuously expose a fresh heat exchange surface to the dessert mix contained therein, whereby there is obtained effective heat transfer from the mix to the refrigerant.

In order to effectively carry out the conditions of the process of this invention, the mutator is eccentrically disposed, whereby the mutator and its blades subject the mix to intensive shear, which increases as the mix becomes increasingly viscous with reduction in temperature. It should be pointed out, however, that apparatus other than that particularly described may also be utilized in the practice of the present invention, provided, of course, that the mix is subjected to intensive shear during the cooling step.

The mix is passed through the heat exchanger at a rate whereby the mix is discharged therefrom at a temperature whereat at least about 50 percent of the aqueous component of the mix is present in a crystalline state. This temperature is a function of the composition of the aqueous component of the dessert mix, and, in general, this temperature will decrease as the level of solutes in the aqueous component is increased. The time required to attain this temperature is dependent upon the temperature of the refrigerant, the temperature at which the mix enters the heat exchanger, and the efficiency of heat transfer from the mix to the refrigerant. However, the temperature where this condition exists is substantially below the temperature at which ice cream and ice milk are normally discharged from a heat exchanger. In this connection, ice cream and ice milk are normally discharged at temperatures at which less than about 45 percent of the aqueous phase is crystallized. In general, the temperature of discharge in accordance with the present invention will be below about 18° F. and will usually be below 17° F.

The mix is packaged and hardened after discharge from the heat exchanger to provide the low-fat frozen dessert of the present invention. As pointed out hereinbefore, the frozen dessert has texture and flavor which is superior to prior art frozen desserts having equivalent fat levels. In addition, the frozen dessert has unique and unexpected thawing characteristics.

In this connection, it is observed that, when exposed to temperatures higher than the normal melting point of the aqueous component, the product of the present invention retains its integrity and shape for extended periods of time. In addition, there is markedly less leakage of liquid from the product at these temperatures than from frozen desserts heretofore known.

For example, when a given mass of the product of the present invention is exposed to room temperature, it is observed that, for a given time of exposure, the rate of release of liquid therefrom is less than about one-half the rate of release of liquid from conventional frozen desserts. In addition, the body and shape of the product of the present invention are retained more than twice as long as with frozen desserts heretofore known.

As a result of the foregoing thawing characteristics, the product of the present invention has the attributes of a "non-melting" frozen dessert. Obviously, however, the product does in fact melt at room temperature, but it is thought that the particular distribution of the fat component, set forth hereinbefore, inhibits leakage of the aqueous component and tends to maintain the integrity and shape of the product.

It is also possible that the improved texture and flavor of the product of the present invention is caused by the particular distribution of the fat component therein. Since the fat component is not distributed as spheres, the surface area of the fat component is substantially increased. Accordingly, the desirable organoleptic properties of the fat component are readily apparent even at relatively low fat levels.

*Example I*

As an example of the practice of the present invention, an ice milk mix was prepared comprising about 12 percent MSNF, about 10 percent sucrose, about 7.5 percent corn syrup solids, about 4.1 percent butter fat, with the remainder comprising water and various stabilizing agents.

The foregoing ice milk mix was pumped into the first cylinder of a Votator unit at a rate of 185 gallons per hour. The temperature of the mix was 45° F. The first cylinder included a concentric mutator revolving at about 500 r.p.m. The cylinder was cooled with ammonia, and the temperature of the ammonia was about −30° F.

The mix was discharged from the first cylinder at a temperature of about 23.5° F., whereupon the mix was introduced to a second cylinder.

The second cylinder of the Votator unit was provided with an eccentric mutator revolving at about 125 r.p.m. The blades on the mutator were biased against the cylinder walls by biasing means. The mix was subjected to intensive internal shear as the mutator revolved and as the mix was continuously forced at relatively high velocity around the annular space between the mutator and the cylinder walls.

The cooled mix was discharged from the second cylinder at a temperature of about 17.5° F. At this temperature, about 58 percent of the aqueous component of the mix was present in a crystalline state.

The mix was packaged in half gallon cartons, and was hardened in a hardening room at −20° F. to provide a low fat frozen dessert.

The frozen dessert had excellent texture and flavor, and in these respects was considered to be equivalent to a frozen dessert comprising at least about 10 percent milk fat.

The low fat frozen dessert maintained its integrity and shape for extended periods of time upon exposure to room temperature. In this connection, a sample of this frozen dessert and of a control sample prepared from the same mix in accordance with conventional procedures were allowed to stand at room temperature for 45 minutes, and the liquid material which separated from each sample was collected and weighed. At the end of this time, 47 percent by weight of the control sample had separated as liquid, while only 25 percent by weight of the dessert prepared in accordance with the present invention had separated as liquid.

*Example II*

As a further example of the practice of the present invention, an ice milk mix was prepared which comprised about 13 percent MSNF, about 12 percent sucrose, about 8 percent corn syrup solids, about 2 percent egg albumen solids, and about 4.5 percent butterfat, with the remainder comprising water and various emulsifiers and stabilizers.

The foregoing mix was introduced to the same apparatus as described in Example I. The mix was at a temperature of 45° F., and was introduced at a rate of 305 gallons per hour.

The mix was discharged from the first cylinder at a temperature of 22.5° F., and was discharged from the second cylinder at a temperature of 16° F. At this temperature, about 53 percent of the aqueous component of the mix was present in a crystalline state.

The cooled mix was packaged and hardened as in Example I to provide a low fat frozen dessert. The frozen dessert had excellent texture and flavor, and, in this connection, the frozen dessert was given a market evaluation and in this evaluation it was compared to an ice cream comprising 12 percent milk fat. In the evaluation about fifty percent of those tasting the products preferred the product of this example.

The frozen dessert had thawing characteristics similar to those set forth in Example I.

Thus, there has been provided an improved low-fat frozen dessert and a process of making the same. The product has improved texture and flavor, and also has unique thawing characteristics.

The foregoing description and examples will suggest various modifications in the process and processing equipment to those skilled in the art. Such modifications are deemed to be within the scope of the present invention.

Various of the features of the present invention are set forth in the following claims.

What is claimed is:

1. A method for preparing a low-fat frozen dessert, comprising the steps of preparing a mix comprising an aqueous component and a fat component, the fat component comprising between about 2 percent and 10 percent of the mix, cooling the mix and simultaneously subjecting the mix to intensive shear during said cooling, terminating said cooling and said shear when the mix reaches a temperature whereat between about 50 percent and about 55 percent of the aqueous component of the mix is present in a crystalline state and thereafter freezing and hardening the mix to provide a low fat frozen dessert.

2. A method for preparing a low-fat frozen dessert, comprising the steps of preparing a mix comprising an aqueous component and a fat component, the fat component comprising about 4 percent of the mix, cooling the mix and simultaneously subjecting the mix to intensive shear during said cooling, terminating said cooling and said shear when the mix reaches a temperature whereat between about 50 percent and about 55 percent of the aqueous component of the mix is present in a crystalline state, and thereafter freezing and hardening the mix to provide a low fat frozen dessert.

3. A method for preparing a low-fat frozen dessert, comprising the steps of preparing a mix comprising an aqueous component and a fat component, the fat component comprising about 4 percent of the mix, cooling the mix and simultaneously subjecting the mix to intensive shear during said cooling, terminating said cooling and said shear when the mix reaches a temperature whereat about 55 percent of the aqueous component of the mix is present in a crystalline state, and thereafter freezing and hardening the mix to provide a low fat frozen dessert.

4. An improved low-fat frozen dessert prepared by the method set forth in claim 1.

References Cited in the file of this patent
FOREIGN PATENTS 581,838    Canada _____ Aug. 25, 1959

OTHER REFERENCES

Keeney et al.: The Ice Cream Trade Journal, May 1958, pp. 32–34, 36, 64, 98.

Frandsen et al.: "Ice Cream and Related Products," April 1961, The AVI Publishing Co., Inc., Westport, Conn., pp. 190 and 343.